Figure 8:
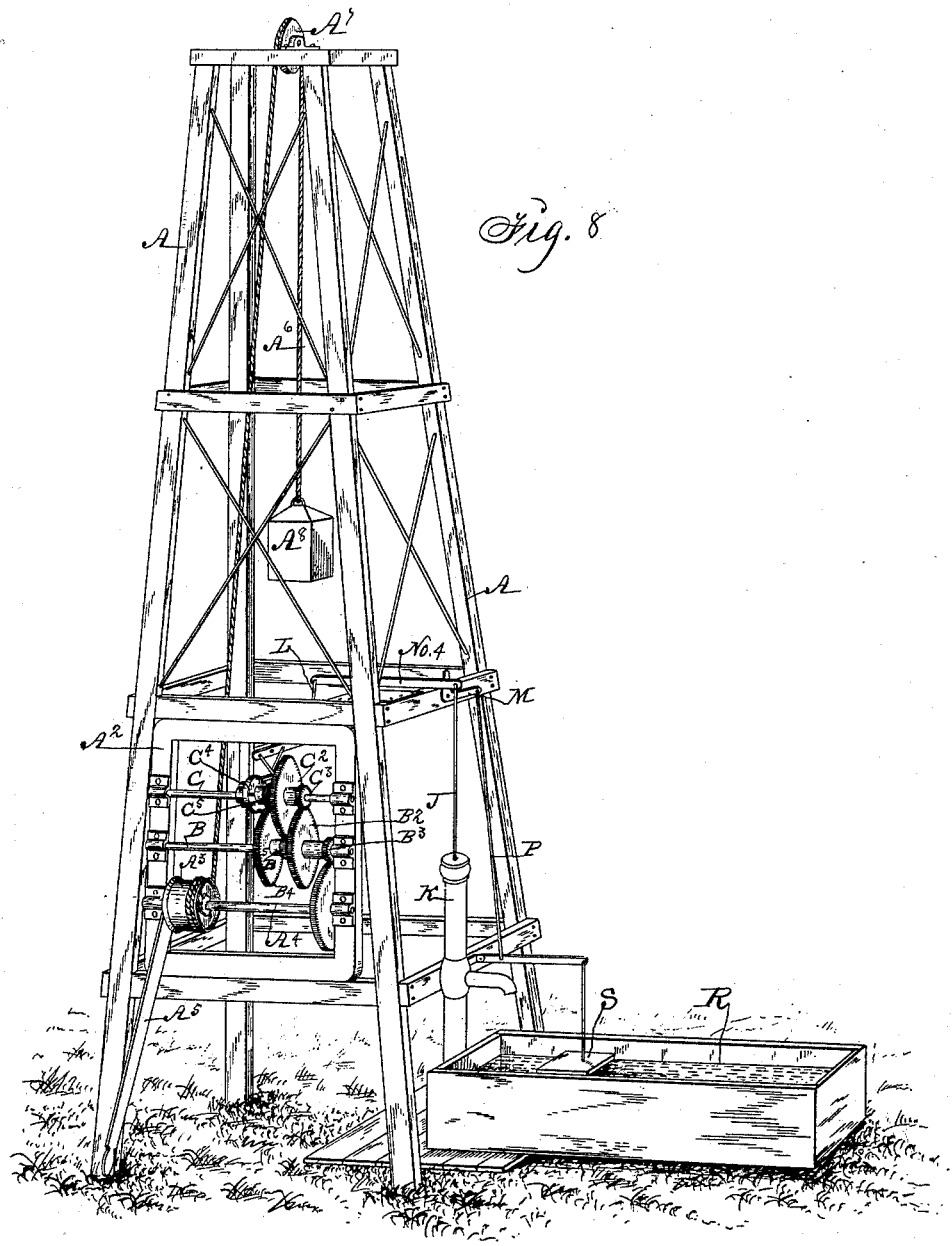

(No Model.) 3 Sheets—Sheet 1.
A. F. DRAKE & W. WONN.
GRAVITY MOTOR.
No. 483,645. Patented Oct. 4, 1892.
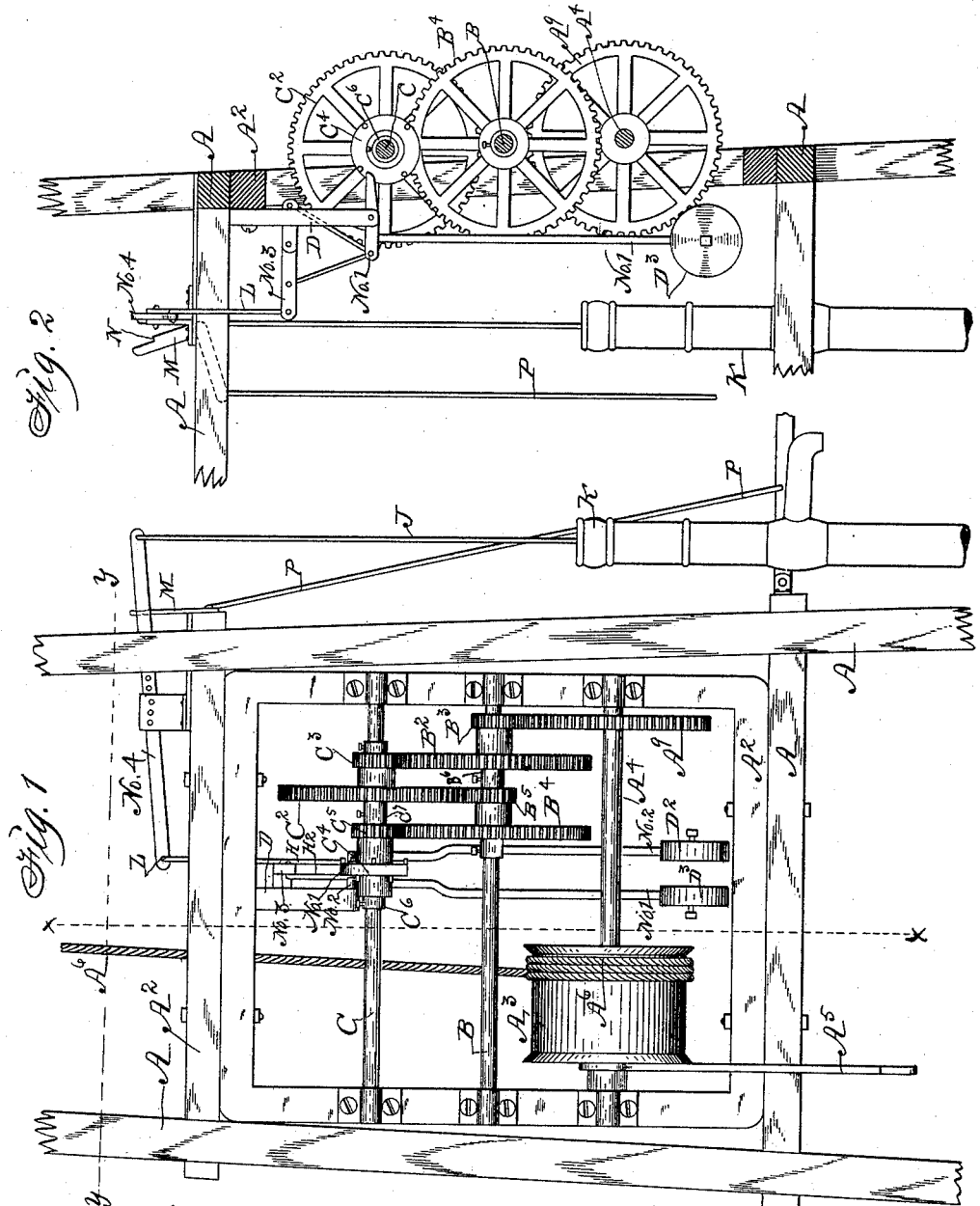
Witnesses: W. S. Sankey, R. H. Orwig
Inventors: Ambrose F. Drake and William Wonn, By Thomas G. Orwig, Attorney (No Model.) 3 Sheets—Sheet 2.
A. F. DRAKE & W. WONN.
GRAVITY MOTOR.
No. 483,645. Patented Oct. 4, 1892.
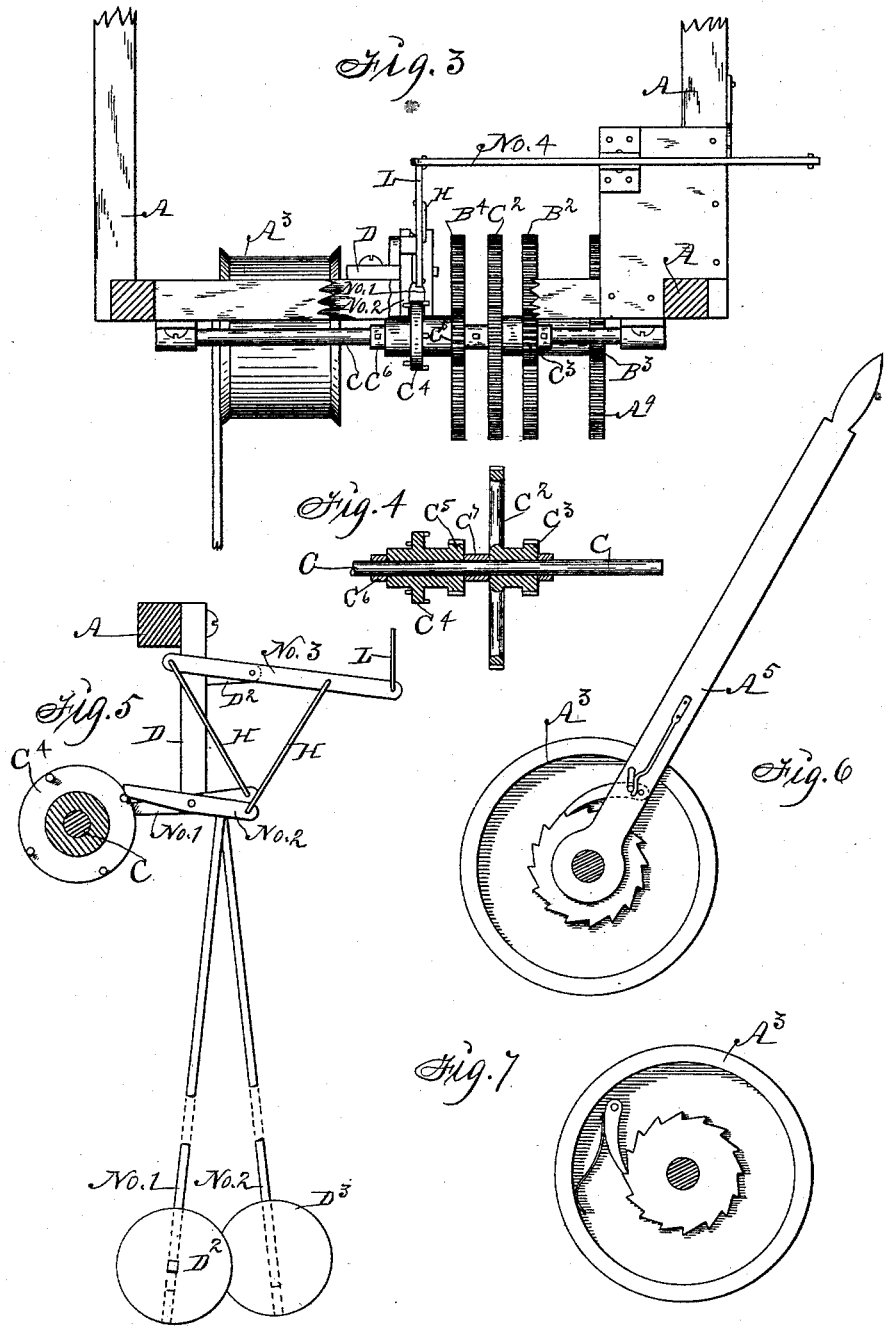

(No Model.) 3 Sheets—Sheet 3.

A. F. DRAKE & W. WONN.
GRAVITY MOTOR.

No. 483,645. Patented Oct. 4, 1892.

Witnesses:
W. J. Sankey.
R. C. Orwig

Inventors: Ambrose F. Drake,
and William Wonn,
By Thomas G. Orwig, Attorney.

UNITED STATES PATENT OFFICE.

AMBROSE F. DRAKE AND WILLIAM WONN, OF AUDUBON, IOWA.

GRAVITY-MOTOR.

SPECIFICATION forming part of Letters Patent No. 483,645, dated October 4, 1892.

Application filed May 16, 1892. Serial No. 433,245. (No model.)

*To all whom it may concern:*

Be it known that we, AMBROSE F. DRAKE and WILLIAM WONN, citizens of the United States of America, residing at Audubon, in the county of Audubon and State of Iowa, have invented a new and useful Gravity-Motor, of which the following is a specification.

Our object is to provide a motor specially adapted to be applied to a windmill-tower to supersede the use of a wind-wheel for operating a pump and other machinery.

Our invention consists in the construction, arrangement, and combination of mechanism for elevating and suspending a weight; mechanism for transmitting power from the weight to a train of loose gear-wheels on stationary shafts and to increase speed; auxiliary weights to add power and mechanism to govern power and motion and transmit it from the train of wheels and auxiliary weights; a system of levers for transmitting, increasing, and applying power to a pump or other machinery, and an automatic stop device, as hereinafter set forth, pointed out in our claims, and illustrated in the accompanying drawings, in which—

Figure 1 is a side view of a portion of a tower, showing our invention applied and connected with a pump and a trough, as required in practical use for watering stock. Fig. 2 is a vertical sectional view on the line $xx$ of Fig. 1. Fig. 3 is a horizontal sectional view looking downward from the line $yy$ in Fig. 1, clearly showing the connection of the governor mechanism with the train of loose wheels. Fig. 4 is a sectional view showing a pin-wheel combined with a fixed shaft and the train of loose gear-wheels. Fig. 5 is a detail view showing auxiliary weights combined with the pin-wheel and a system of levers for transmitting and uniting the power of the main weight and the power of the auxiliary weights. Fig. 6 is an end view of the drum by means of which the main weight is elevated and suspended, showing a lever and ratchet for rotating the drum and elevating the main weight therewith by means of a rope. Fig. 7 shows the other end of the drum and a pawl and ratchet for preventing a backward motion of the drum. Fig. 8 is a perspective view showing our complete invention in position as required for operating a pump to water stock.

A represents a tower or other suitable support for our mechanisms.

$A^2$ is a frame adapted for mounting a drum and a train of gear-wheels thereon and also adapted to be fixed to the tower A.

$A^3$ is a drum fixed to a rotating shaft $A^4$, mounted in bearings fixed to the frame A.

$A^5$ is a lever pivotally connected with the shaft $A^4$ and carries a spring-actuated pawl to engage a ratchet on the end of the drum, as shown in Fig. 6.

$A^6$ is a rope or cable fixed to the drum $A^3$ and extended over a pulley $A^7$ at the top of the tower to suspend a weight $A^8$, as shown in Fig. 8.

$A^9$ is a gear-wheel fixed to the end portion of the shaft $A^4$.

B is a shaft fixed to the frame A in a plane above the shaft $A^4$.

$B^2$ is a gear-wheel loosely mounted on the shaft B.

$B^3$ is a pinion or small wheel formed on or fixed to the hub of the wheel $B^2$ in such a manner that it will engage the wheel $A^9$ on the shaft $A^4$.

$B^4$ is a gear-wheel corresponding in size with the wheel $B^2$ and also mounted loosely on the shaft B, and $B^5$ is a pinion or small wheel formed on or fixed to the hub of the wheel $B^4$.

$B^6$ is a collar fixed to the shaft B to retain the loose wheels in proper position upon the shaft.

C is a shaft fixed to the frame $A^2$ in a plane above the shaft B.

$C^2$ is a gear-wheel mounted loosely on the shaft C and adapted in size and position to engage the small wheel $B^5$ on the shaft B.

$C^3$ is a small wheel formed on or fixed to the hub of the wheel $C^2$ and adapted in size and position to engage the wheel $B^2$ on the shaft B.

$C^4$ is a duplex pin-wheel having a series of pins on each side, adapted to alternately engage levers, as hereinafter described. It is loosely mounted on the shaft C, and $C^5$ is a small gear-wheel formed on or fixed to the hub thereof and adapted in size and location to engage the wheel $B^4$ on the shaft B.

$C^6$ and $C^7$ are collars fixed to the shaft C by means of set-screws to retain the loose wheels in proper positions relative to the wheels on the shaft B.

Nos. 1 and 2 are elbow-shaped levers pivoted to the lower end of a bearer D, that is fixed to the frame $A^2$ in such a manner that the short arms of the two mating levers will alternately engage the pins on the opposite sides of the duplex pin-wheel $C^4$, as required to be simultaneously vibrated thereby in opposite directions and to transmit power from the pin-wheel. On the long arm of each of the mating levers is an adjustable auxiliary weight $D^2$ and $D^3$, the force of which, as it moves like a pendulum, is united with the force transmitted from the main weight $A^8$ through the rope and drum, the train of loose gear-wheels, and the duplex pin-wheel to the mating levers Nos. 1 and 2.

No. 3 is a lever pivoted to a branch F of the bearer D and pivotally connected with the inner ends of the levers Nos. 1 and 2 by means of rods H and $H^2$, that are pivoted to the lever No. 3 at points equidistant from the fulcrum, as required to vibrate the lever in a vertical plane.

No. 4 is a lever fulcrumed to a suitable bearer on the tower A in a plane above the lever No. 3 to extend at right angles thereto to transmit power and motion from the lever No. 3 to a pump-rod J, as required to operate a pump K or other extraneous machinery that may be connected with the lever No. 4.

M is an L-shaped device pivoted to the tower A and provided with a shoulder N at its upper end, adapted to engage the lever No. 4, as required, to retain the lever stationary. The lower end is connected with a rod P, that extends down into a watering-trough R and has a float S attached thereto in such a manner that the float will rise as the water rises in the trough to adjust the stop device M, so that it will engage the lever No. 4, as required, to arrest the motion of the machine and pump and prevent an overflow and waste of water from the trough.

In the practical operation of our invention the main weight $A^8$ is readily elevated by manually operating the lever $A^5$ to actuate the drum $A^3$ to wind the rope $A^6$ thereon. The gravity-power of the weight will then be applied to rotate the drum and shaft $A^4$ and the wheel $A^9$, fixed to the shaft $A^4$, jointly, as required, to transmit power and motion to the wheels $B^3$ and $B^2$ on the fixed shaft B, from said wheels to the wheels $C^3$ and $C^2$ on the fixed shaft C, from the wheel $C^2$ to the joint wheels $B^5$ and $B^4$ on the shaft B, and from the wheel $B^4$ to the wheel $C^5$ and duplex pin-wheel jointly mounted upon the shaft C. The power thus transmitted to and concentrated in the duplex pin-wheel from the main weight and the motion of said pin-wheel, increased by the train of loose gear-wheels, is next transmitted and augmented by means of the levers Nos. 1 and 2 and the auxiliary weights suspended thereon to the lever No. 3, by the alternate motions of said mating levers Nos. 1 and 2 as they are alternately engaged by the pins of the pin-wheel to be alternately vibrated thereby, and the rotary motion of the pin-wheel thereby converted into a reciprocating vibratory motion, and the joint action of the two mating levers is transmitted to the lever No. 3, to the lever No. 4, and from thence to the pump-rod or such other extraneous machinery as may be connected therewith.

It is obvious that the pin-wheel as connected with the train of loose wheels and the levers Nos. 1 and 2 also performs the functions of an escapement in releasing and utilizing the power stored in the drum by means of the rope wound thereon and the weight suspended from the end of the rope. It is also obvious that the auxiliary weights adjustably connected with the long arms of the mating levers Nos. 1 and 2 serve as a means of governing the speed of the train of wheels and the motion of the levers that intervene between the wheels and the pump or other extraneous machinery connected with the lever No. 4, as required to regulate the operation of such machinery. Elevating the auxiliary weights increases speed and lowering them diminishes it.

We claim as our invention—

1. In a gravity-motor, a drum-wheel fixed to a rotating shaft, a rope fixed to the drum and extended over a pulley supported in a higher plane, and a weight attached to the free end of the rope, a fixed shaft extended parallel with the rotating shaft, a gear-wheel having a smaller wheel on its hub mounted loosely on the fixed shaft extended parallel with the first-mentioned fixed shaft, and a gear-wheel mounted loosely thereon to engage the small wheel on the first fixed shaft and a small wheel on the hub thereof to engage the large wheel on the first shaft, and a duplex pin-wheel mounted loosely on the second fixed shaft, and a small gear-wheel combined with the hub of the pin-wheel to engage one of the larger wheels on the first fixed shaft, arranged and combined to operate in the manner set forth, for the purposes stated.

2. In a gravity-motor, two uniform elbow-shaped levers pivoted at the central portions of their short arms and in parallel position to vibrate in vertical planes and a weight adjustably attached to the lower end of the long arm of each of said mating levers, and the free end of each short arm adapted to engage the pins of a pin-wheel, in combination with a duplex rotating pin-wheel, to operate in the manner set forth, for the purposes stated.

3. In a gravity-motor, a duplex pin-wheel at the end of a train of gear-wheels for transmitting power and motion to extraneous machinery, two mating elbow-shaped levers pivoted in parallel position to vibrate in vertical planes, a weight adjustably connected with the long arm of each of said mating levers, and a third lever pivoted in a higher plane and connected at points opposite its fulcrum with the mating elbow-shaped levers, said elbow-shaped levers carrying weights at their lower ends, all arranged and combined to serve as an escapement and also as a governor and to transmit power and convert motion, in the manner set forth.

4. Mechanism for transmitting and converting motion, consisting of a rotating duplex pin-wheel, two mating elbow-shaped levers pivoted in parallel position to alternately engage the pin-wheel at the ends of their short arms, weights adjustably connected with the long arms of the said mating levers to vibrate in vertical planes, a third lever pivoted in a higher plane and connected with the said mating elbow-shaped levers by means of rods that extend from points on the opposite side of its fulcrum to the said mating levers, and a fourth lever connected with the said third lever to extend to a pump or other extraneous machinery, all arranged and combined to operate in the manner set forth, for the purposes stated.

5. A gravity-motor comprising a drum and fixed gear-wheel on a rotating shaft, a rope fixed to the drum and extended over a pulley supported in a higher plane, a fixed shaft extended parallel with the said rotating shaft, a gear-wheel having a gear-wheel smaller in diameter on the hub mounted loosely on said fixed shaft, a second gear-wheel mounted loosely on the same fixed shaft, a second fixed shaft in parallel position with the first-named fixed shaft, a gear-wheel having a gear-wheel of smaller diameter on its hub mounted loosely on the said second fixed shaft to allow the large wheel to engage the small wheel on the first shaft and the small wheel to engage the large wheel on the first fixed shaft, a duplex pin-wheel and gear-wheel combined and loosely mounted on the second fixed shaft to rotate jointly and the gear-wheel to engage one of the gear-wheels of larger diameter on the first fixed shaft, two mating elbow-shaped levers pivoted in parallel position to allow the ends of their short arms to alternately engage the duplex pin-wheel and vibrate vertically, a weight on the lower end of the long arm of each of said levers, a third lever pivoted in a higher plane and its end portions connected with the mating elbow-shaped levers, and a fourth lever connected with the third lever to extend to a pump-rod or other machinery, all arranged and combined to operate in the manner set forth.

AMBROSE F. DRAKE.
WILLIAM WONN.

Witnesses:
H. A. CHRISTENSEN,
F. E. BRAINARD.